United States Patent
Medina et al.

(10) Patent No.: US 7,692,557 B2
(45) Date of Patent: Apr. 6, 2010

(54) APPARATUS FOR ASSISTING VEHICLE OPERATORS WITH BACKUP OPERATIONS

(76) Inventors: Donald A. Medina, 3575 Saratoga, Lake Havasu City, AZ (US) 86406; Daniel L. Schnore, 1471 Mojave Dr., Lake Havasu City, AZ (US) 86406

( * ) Notice: Subject to any disclaimer, the term of this patent is extended or adjusted under 35 U.S.C. 154(b) by 457 days.

(21) Appl. No.: 11/602,086

(22) Filed: Nov. 20, 2006

(65) Prior Publication Data
US 2008/0117030 A1     May 22, 2008

(51) Int. Cl.
*G08G 1/123* (2006.01)
(52) U.S. Cl. .................... 340/988; 340/431
(58) Field of Classification Search ............... 340/988, 340/431, 618, 623, 625; 116/109, 227, 229; 73/290 R, 305, 313, 317; 200/230, 84 R
See application file for complete search history.

(56) References Cited

U.S. PATENT DOCUMENTS

| | | | | |
|---|---|---|---|---|
| 3,585,582 A | * | 6/1971 | Dove | 340/431 |
| 3,909,948 A | * | 10/1975 | Markfelt | 340/620 |
| 3,995,251 A | * | 11/1976 | Jones | 340/431 |
| 4,008,466 A | * | 2/1977 | Smith | 340/431 |
| 4,277,081 A | | 7/1981 | Stoutenburg | |
| 4,972,705 A | * | 11/1990 | Fryer et al. | 340/618 |
| 5,097,250 A | * | 3/1992 | Hernandez | 340/438 |
| 5,209,112 A | * | 5/1993 | McCoy et al. | 73/170.01 |
| 5,247,442 A | * | 9/1993 | Kendall | 701/41 |
| 5,515,025 A | * | 5/1996 | Barrows | 340/431 |
| 5,719,552 A | * | 2/1998 | Thompson | 340/431 |
| 5,850,175 A | * | 12/1998 | Yeilding | 340/431 |
| 5,949,329 A | * | 9/1999 | Woodard | 340/431 |

* cited by examiner

*Primary Examiner*—John A Tweel, Jr.
(74) *Attorney, Agent, or Firm*—Edell, Shapiro & Finnan, LLC

(57) ABSTRACT

An apparatus for providing instructions to an operator of a single motor vehicle or a vehicle having a trailer attached during backing up procedures, said apparatus comprising: a transmitter unit for wirelessly transmitting data, wherein the transmitter unit includes a plurality of predefined directives and a plurality of activation means wherein each of the plurality of activation means is capable of transmitting one of the plurality of predefined directives; and a receiver unit for wirelessly receiving data from the transmitter, wherein the receiver unit includes a plurality of indicator means wherein each of the plurality of indicators means is capable of indicating one of the plurality of predefined directives; wherein the predefined directives include at least a backdown directive, a stop directive, a left directive, a right directive, and a forward directive, and wherein in trailer operations mode, the activation means corresponding to the right directive results in the indicator means corresponding to the left directive being activated in the receiver unit and the activation means corresponding to the left directive results in the indicator means corresponding to the right directive being activated in the receiver unit.

18 Claims, 4 Drawing Sheets

APPARATUS FOR ASSISTING VEHICLE OPERATORS WITH BACKUP OPERATIONS

BACKGROUND

1. Field of the Invention

The present invention relates generally to systems and methods for operating motor vehicles having trailers attached, and more specifically to an apparatus for assisting an operator performing backing up operations with a trailer in tow or in situations wherein the operators has a limited or obstructed view.

2. Background of the Invention

As discussed in U.S. Pat. No. 4,277,081 to Stautenburg, there are numerous problems associated with the task of backing up a motor vehicle having a trailer in tow. First, the operator of the vehicle must drive the vehicle backwards, which generally requires turning his or her head or body to view path on the course of travel. This problem is accentuated by generally obstructed view of the area directly behind the vehicle and the trailer. In cases, cameras have been installed on the rear of the vehicle and/or trailer to provide a better view. However, this can be costly and may not be practical for recreational users of commonly towed vehicles such as, for example, boats or all terrain vehicles. Another, less costly, solution is to use a guide person who has a clear view of the rear area and who conveys instructions to the driver to aid in the back up operation. The guide person may be situated on the ground, on the trailer or even in the vehicle being towed. The guide person may use hand signals to direct the driver. More commonly, the guide person and the driver communicate through the use of two-way radios or mobile telephones. Those who have used guides to assist in such backing up operations have been faced with various problems. First, as known in the art, there is a need to "counter-steer" the vehicle in order to make the trailer move in the desired direction. That is, in order to back up a trailer to the right, the operator of the vehicle must steer the vehicle to the left. This process is counter-intuitive and causes problems and can lead to accidents. This problem is compounded when driver or guide or both are inexperienced with towing operations. If the guide who provides simple directions to the operator, such as "turn left" or "turn right" referring to the preferred direction of the trailer, the driver will likely steer the vehicle in the direction being communicated rather than the opposite direction required to affect the desired change. If the vehicle operator literally follows such directions and steers the vehicle to the left or right, the trailer will move in the wrong direction and may even hit the guide.

One method of correcting this problem is to instruct the vehicle operator to place his or hand at the bottom of the steering wheel and push it in the direction that one wishes to back the trailer. For example, to back up a trailer right in this manner, the operator would move his or her hand to the right (counterclockwise); to back left, the hand would be moved to left (clockwise). This method, while having great potential to be successful, requires knowledge of the method, as well as much practice to be comfortable in its implementation.

Many trailer operators are recreational users hauling boats or other vehicles requiring launching from specific points. Generally launching such vehicles requires backing the trailer down a ramp and into the water. Often times, the ramps are crowded and narrow and require some precision in aligning the trailer in the water for proper launching. The problem may also arise with the use of other trailers, for example, camping trailers, utility trailers, and the like. In general, any time a vehicle is towing a trailer there may be a need to back the vehicle and trailer. For recreational drivers and guides, there is a need for an apparatus to aid in the provision of instructions from the guide to the operator.

A need therefore exists for a device to aid in the safe and successful backing up of any vehicle having a trailer in tow.

A need further exists for enhanced communication means between a vehicle operator and a guide person to aid in provision of instructions or directives from the guide to the operator during vehicle backup operations.

SUMMARY OF THE INVENTION

The present invention provides an apparatus for conveying instructions from a guide outside a motor vehicle to an operator of the motor vehicle during backing up procedures. The apparatus is beneficial for aiding vehicle operators having a trailer in tow as well as for operators of very large vehicles having obstructed view to the rear who may need assistance with backing up operations. An apparatus according to the present invention comprises: a transmitter unit for wirelessly transmitting data and a receiver unit for wirelessly receiving data from the transmitter. In embodiments of the present invention, the wherein the transmitter unit includes a plurality of predefined directives and a plurality of activation means wherein each of the plurality of activation means is capable of transmitting one of the plurality of predefined directives. The receiver unit according to the present invention includes a plurality of indicator means wherein each of the plurality of indicators means is capable of indicating one of the plurality of predefined directives. Predefined directives include at least a backdown directive, a stop directive, a left directive, a right directive, and a forward directive. When the apparatus is in trailer operations mode, the activation means corresponding to the right directive results in the indicator means corresponding to the left directive being activated in the receiver unit and the activation means corresponding to the left directive results in the indicator means corresponding to the right directive being activated in the receiver unit.

DETAILED DESCRIPTION OF THE INVENTION

Figure 1:
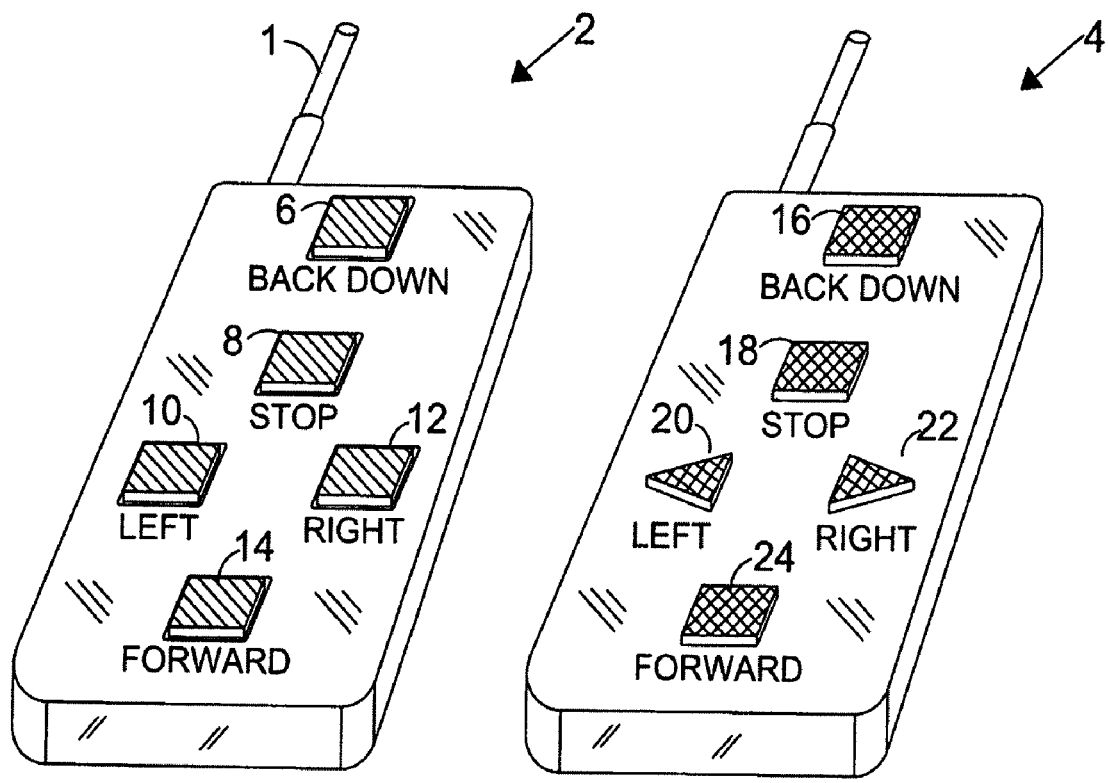
FIG. 1 shows an embodiment of a transmitter and receiver according to the present invention.

As shown in FIG. 1 an embodiment of the present invention comprises transmitter unit 2 and receiver unit 4. Transmitter unit 2 is a device adapted for use as either a handheld unit or may be installed on the vehicle being towed. As shown in FIG. 1, transmitter unit 2 includes buttons or other activation means for the guide to input directives to be transmitted to the vehicle operator. The activation means and corresponding directives may include, for example, backdown button 6, stop button 8, left button 10, right button 12, and forward button 14. Receiver unit 4 also includes a plurality of indicator means which each correspond to one of the directives. As shown in FIG. 1, the indicator means may comprise a plurality of lights which light up in response to a directive received from the transmitter. Activation means may include backdown indicator 16, stop indicator 18, left indicator 20, right indicator 22, and forward indicator 24. If lights are used as the indicator means, different colors may be used to further emphasize the information directive being conveyed to the operator. For example, stop indicator 18 may emit a red light or may have a translucent red-colored face plate so that when the light is activated a red-colored signal is displayed. Similarly, forward indicator 24 may display a green-colored signal, backdown indicator 16 may be, for example yellow-colored. Further, as shown in FIG. 1, one of more of the indicators may have a shape denoting directions as well. The style, shape and color of the indicator means may be any style, shape and color to convey as much useful information to the operator in a simple display manner.

When a guide person using the transmitter means to convey instructions to the driver of a vehicle presses one of the buttons on transmitter unit 2, the correct corresponding indicator light on the receiver unit lights up to visually instruct the operator how to steer the vehicle. Importantly, the directive to move the trailer to the left corresponds to the indicator means informing the operator to steer the vehicle to the right. Similarly, the directive to move the trailer to the right corresponds to the indicator means informing the operator to steer the vehicle to the left. In this manner, the guide inputs a directive based on the desired movement of the trailer and the operator is given the instruction to steer the vehicle in the in a manner to achieve the desired result.

A transmitter and receiver unit according to the present invention may each also include a microphone and speaker to enable voice communications between the guide and the operator. While such additional features may be used to enhance the communication of ancillary information between the guide and the vehicle operator, in accordance with the present invention, it is preferable to reduce to use the activation means and the indicator means to convey instructions for movement of the vehicle and trailer.

In place of, or in addition to, indicator lights on receiver unit 4, the indicator means may comprise a plurality of audible messages which are played upon receipt of the instruction from the transmitter unit. For example, when the guide activates the directive to "turn left" the receiver unit may audibly instruct the operator to "turn the steering wheel right" or some simply instruct "right."

The transmitter unit and receiver units may be programmable to operate in various modes. For example, in one mode, the units may be programmed such that when the guide to presses a button, the desired directive may be continuously conveyed via the receiver unit until a different button is pressed by the guide. In another mode, the guide may have to continuously press and hold the button if the directive is to be repeated. In this mode, upon release of the button, the receiver unit will cease conveying the instruction to the operator.

Embodiments of the present invention may also include an attachment means on the receiver unit adapted to attach the receiver unit to the dashboard of any automobile. In other embodiments, the receiver unit may include an attachment means adapted to attach the receiver unit to the steering column of an automobile or other location suitable for the vehicle in which it is to be used. The permanence of the installation may depend on whether or not the operator has multiple vehicles in which the unit may be used. For example, the attachment means could be hook and loop fasteners to secure the unit while allowing for easy removal for use in other vehicles. The attachments could also be a clamp or bracket which can be used to secure the unit inside the vehicle. Any suitable means for securing the receiver unit in the vehicle will work.

Further, embodiments of the present invention may include attachment means on the transmitter unit adapted to attach the transmitter unit to the dashboard of a boat or the vehicle being towed. This may be desirable in some cases where the guide, rather than standing along side or behind the towing vehicle, sits in the vehicle being towed. For example, to load a boat onto the trailer, the vehicle operator backs the trailer partially into the water and then someone must drive the boat onto the trailer. In this situation, if there are only two persons available, one must operate the vehicle towing the trailer and the other must drive the boat. The present invention enhances the ability of the boat operator to convey instructions to the vehicle operator to position the trailer to align the two vehicles. In this situation, securing the transmitter to the dashboard area of the boat may be useful.

Due the large number of recreational trailer users in certain high traffic areas, embodiments of the present invention may also include a security means on the transmitter unit and receiver unit to secure the transmission of data from the transmitter unit to the receiver unit. The security means may comprise the ability to select alternate channels for transmission of the data to reduce the possibility of conflicting signals from similar units or may include more complex authentication algorithms.

Figure 2:
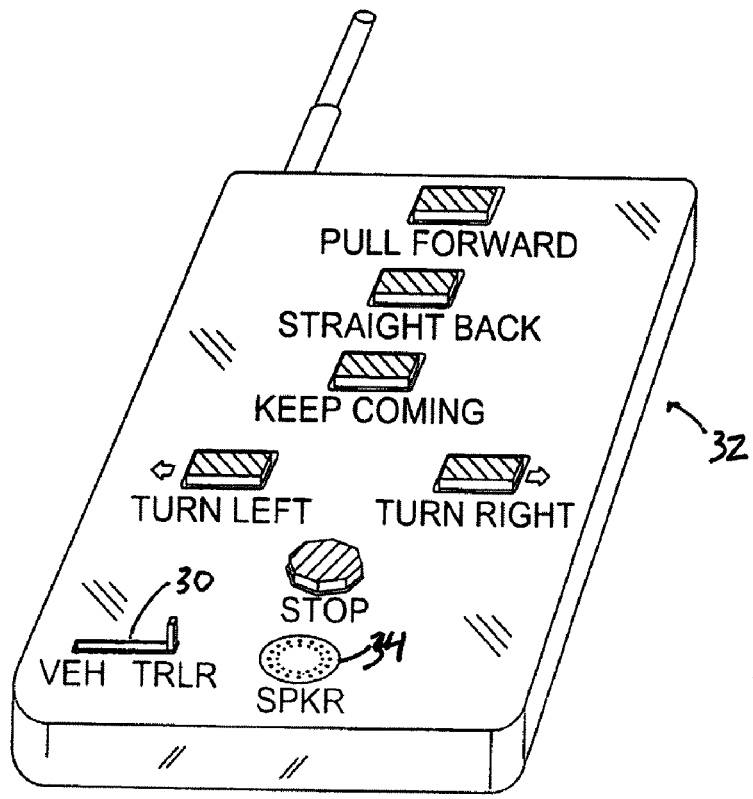
FIG. 2 shows an embodiment of a transmitter according to the present invention.

FIG. 2 shows another embodiment of a receiver according to the present invention. In this embodiment, the receiver includes switch 30 which allows the operator of the vehicle to select an operation mode. As described herein, embodiments of the present invention may be used advantageously for assisting vehicle operators when backing up the vehicle with a trailer in tow. In those cases, the left indicator means on the receiver will light up or provide some other alert in response to a right directive input by a guide outside the vehicle. This compensates for the manner in which the vehicle steering wheel must be turned to affect a given lateral movement of the trailer. However, embodiments of the present invention may also be used advantageously for very large vehicle having limited rear visibility, whether or not a trailer is being used. In situations wherein no trailer is being towed, if the guide outside the vehicle instructs the operator to turn left, meaning the desired result is the vehicle to back to the left, the correct action for the operator is to turn the steering wheel to the left. In this case, there is no need for crossing the lateral directives entered with lateral indicators activated. Switch 30 allows for dual use of embodiments of the present invention in either single vehicle mode or trailer mode.

FIG. 2 further shows other features that may be used to enhance embodiments of the present invention. For example, receiver 32 includes speaker 34 which allows for verbal communications between the operator and the guide. Receiver 32 also includes indicators that include further visual aid to the operator. For example, stop indicator 34 is has an octagon shape to mimic a conventional stop sign.

Figure 3:
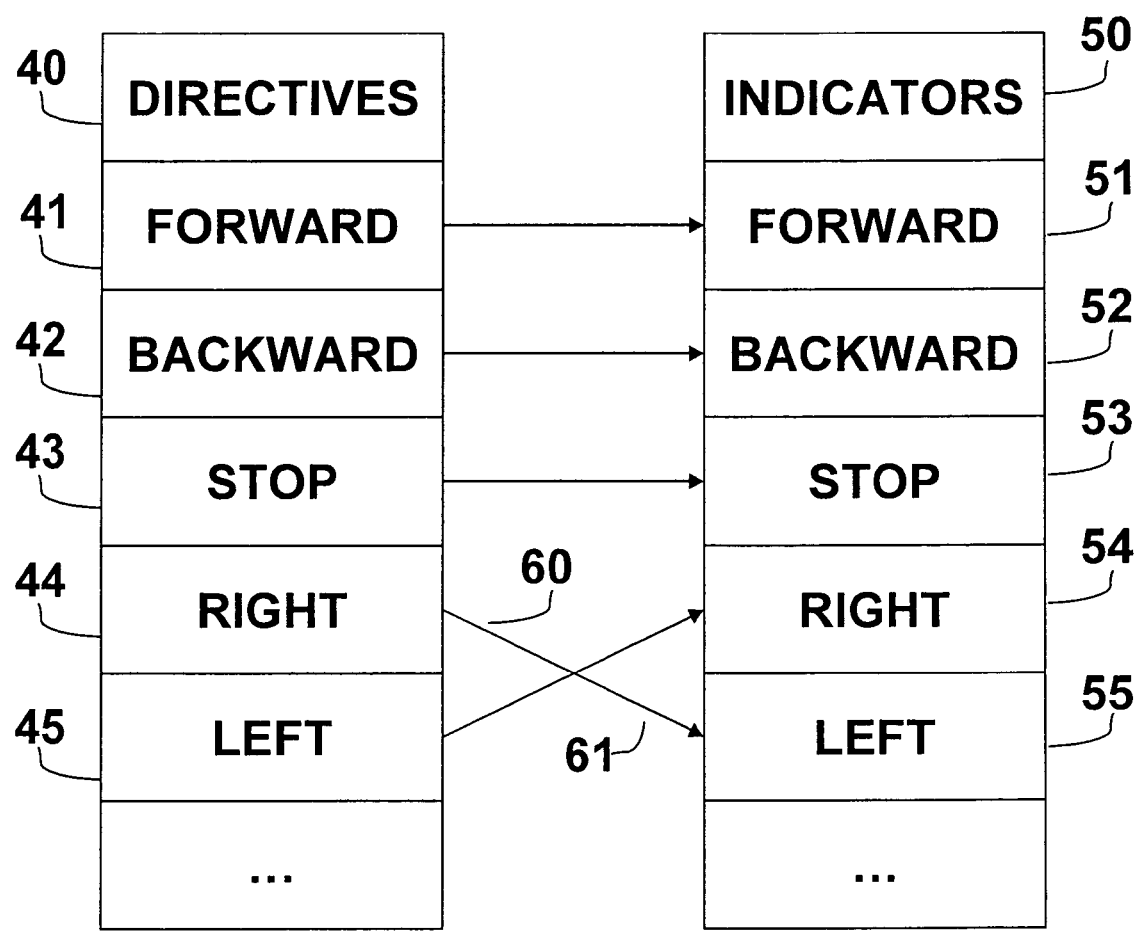
FIG. 3 is a block diagram showing the mapping between directives and indicators in an embodiment of the present invention.

FIG. 3 shows a mapping of directives and indicators in embodiments of the present invention. Directives 40 include forward directive 41, backward directive 42, left directive 45, right directive 44 and stop directive 43. Indicators 50 include forward indicator 51, backward indicator 52, left indicator 55, right indicator 54 and stop indicator 53. As shown in FIG. 3, in embodiments of the present invention, mapping 61 maps left directive 45 to right indicator 54. Similarly, mapping 60 maps right directive 44 to right left indicator 55. As discussed herein, if an embodiment of the invention includes a single vehicle mode, then the mappings would not be crossed while in single vehicle mode, but would be crossed while in trailer mode.

Figure 4:
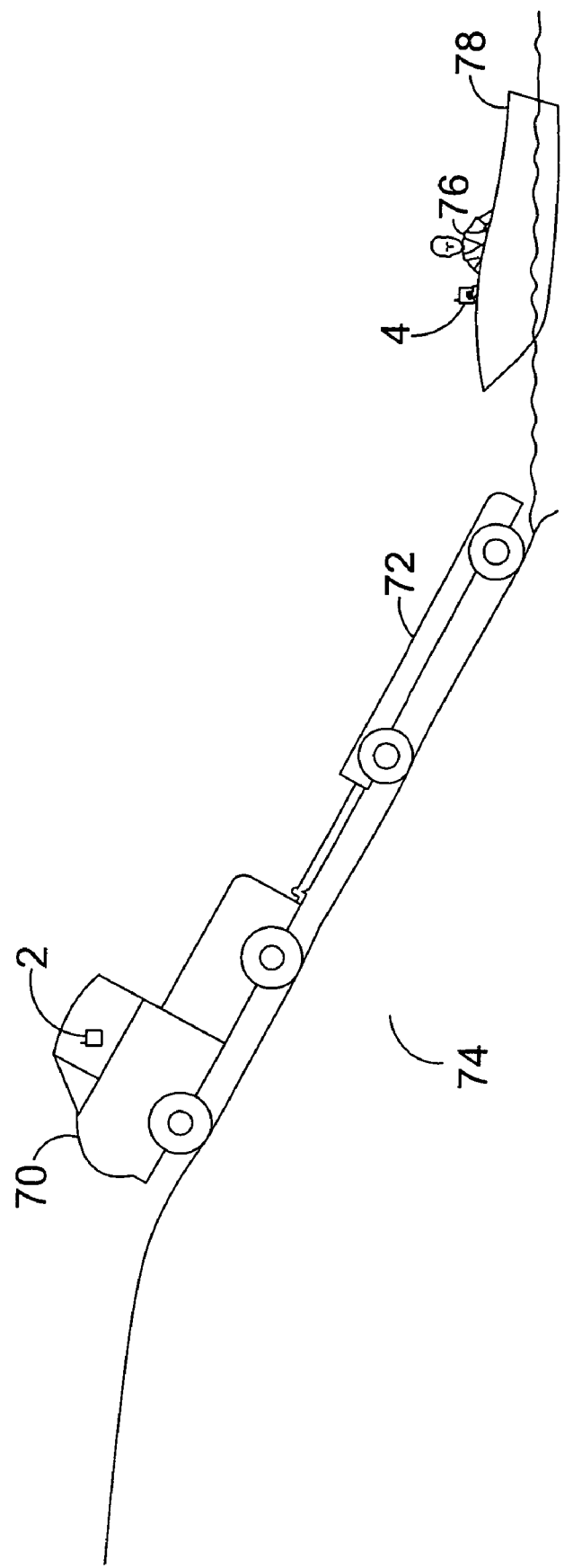
FIG. 4 shows an embodiment of the present invention beings used to assist an operator backing up a vehicle having a trailer in tow.

FIG. 4 shows a truck 70 towing trailer 72 backing down boat ramp 74. An operator (not shown) in truck 70 receives instructions from guide 76 shown in boat 78. Guide 76 uses transmitter 4, according to the present invention to send instructions to receiver 2 to assist the truck operator in properly aligning the trailer for loading of the boat. As described herein, while receiver 2 may be primarily used for receiving directives for indicating the directional movement of the vehicle, it may also include transmitter means for transmitting data, including voice data, to transmitter 4. Similarly, transmitter 4 may also include receiving means to receive data, including voice data from receiver 2.

Figure 5:
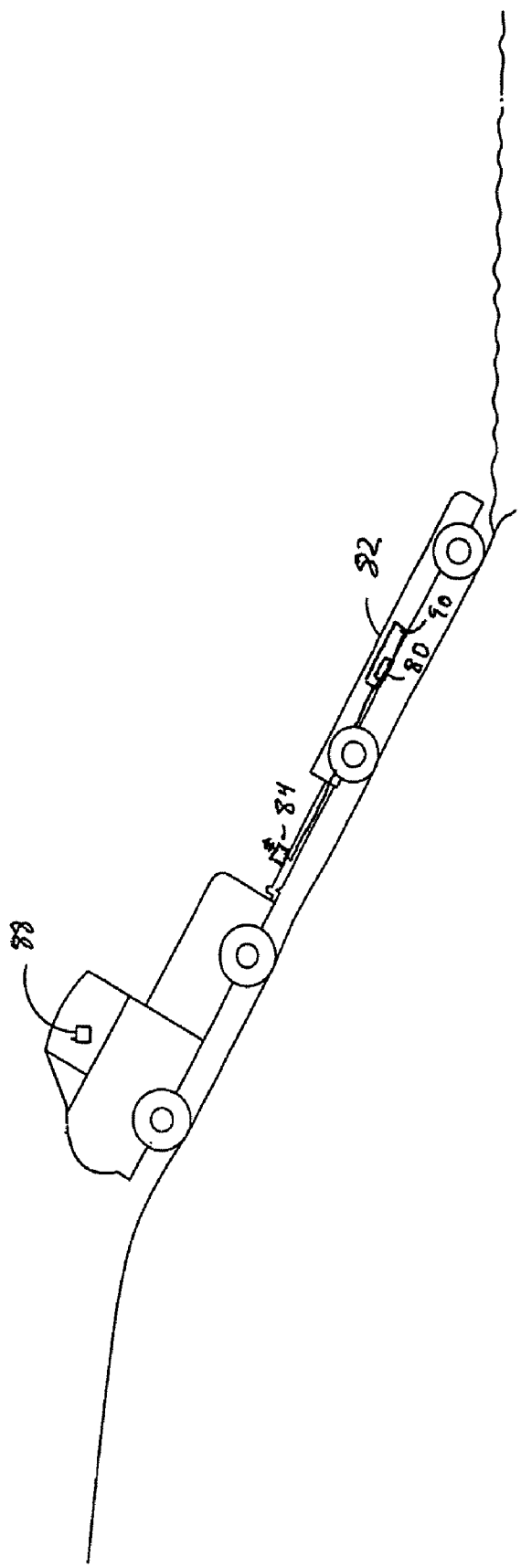
FIG. 5 shows another embodiment of the present invention wherein directives are automatically transmitted to the vehicle operator in certain situations.

FIG. 5 shows another embodiment of the present invention wherein certain directives are automatically transmitted to the vehicle operator to inform the vehicle operator when a trailer has reached a depth necessary for launching or loading a boat. As shown in FIG. 5, sensor 80 is mounted on boat trailer 82 in a location suitable for detecting a depth of the boat trailer in the water. When boat trailer 82 reaches the water, a signal is transmitted via transmitter 84 to receiver 88. The receiver translates the signal to provide an appropriate instruction to the driver.

In one embodiment, as the vehicle operator backs the boat trailer down ramp 86 into the water, a signal may be transmitted to the operator to continue the back up operation. When sensor 80 detects that it has reached the water, a different signal is transmitted to the operator to instruct the operator to stop the vehicle. Alternatively, when the vehicle operator is backing the vehicle down the ramp, no signal may be transmitting, but when sensor 80 reaches the water, a signal may then be transmitted. As would be apparent to one of skill in the art, transmitter 84 may comprise an antenna mounted on the trailer which may or may not be collocated with sensor 80. That is transmitter 84 could be mounted on the tongue or a fender on boat trailer 82 and connected to sensor 80 via wire 88 as shown in FIG. 5. Alternatively, transmitter 84 could be collocated or could be an integrated unit with sensor 80.

Sensor 80 may be a any sensor suitable for detecting the depth of the trailer in the water. For example, the sensor may be a pressure sensor that determines the depth of the water. Alternatively, the sensor could be an oxygen sensor that detects the lack of oxygen. Alternatively the sensor could be a mechanical float that raises a lever much as a float for regulating or monitoring the level of fluid in a pool or gasoline tank. Any suitable means, including an electronic means, for detecting that the trailer has been submerged to the level set by the operator will work. In an embodiment of the present invention, sensor 80 may be attached to a movable slide 90 on the trailer as shown in FIG. 5. Use of such a moveable slide allows the operator to select different depths as may be necessary for different boats. While FIG. 5 shows a moveable slide, any means for allowing ease of placement of the sensor on the trailer will suffice. For example, the trailer could have hook and look fasteners attached to the trailer and the sensor could be moveably attached to the trailer in that manner.

A sensor means, transmitter and receiver such as described in relation to FIG. 5 may be integrated into a transmitter and receiver unit such as described in relation to the other Figures. That is the receiver used to receive a signal from the sensor may be the same receiver unit that also receives instructions from the transmitter unit that a guide may be using. The different components have the common goal of providing information to the vehicle operator to aid the operator with backing up the vehicle and the trailer.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An apparatus for providing instructions to an operator of a motor vehicle having a trailer attached during backing up procedures, said apparatus comprising:
   (a) a transmitter unit for wirelessly transmitting data, wherein the transmitter unit includes a plurality of predefined directives and a plurality of activation means wherein each of the plurality of activation means is capable of transmitting one of the plurality of predefined directives; and
   (b) a receiver unit for wirelessly receiving data from the transmitter, wherein the receiver unit includes a plurality of indicator means wherein each of the plurality of indicators means is capable of indicating one of the plurality of predefined directives;
   wherein the predefined directives include at least a back-down directive, a stop directive, a left directive, a right directive, and a forward directive, and wherein the activation means corresponding to the right directive results in the indicator means corresponding to the left directive being activated in the receiver unit and the activation means corresponding to the left directive results in the indicator means corresponding to the right directive being activated in the receiver unit.

2. The apparatus of claim 1, wherein the transmitter unit and the receiver unit each further comprise a microphone and speaker to enable voice communications.

3. The apparatus of claim 1, wherein the plurality of activation means on the transmitter unit comprise a plurality of actuating buttons and the plurality of indicator means on the receiver unit comprise a plurality of indicator lights which emit light upon activation.

4. The apparatus of claim 1, wherein the plurality of indicator means on the receiver unit comprise a plurality of audible messages which are played upon activation.

5. The apparatus of claim 1, further comprising an attachment means on the receiver unit adapted to attach the receiver unit to the dashboard of an automobile.

6. The apparatus of claim 1, further comprising an attachment means on the receiver unit adapted to attach the receiver unit to the steering column of a automobile.

7. The apparatus of claim 1, further comprising an attachment means on the transmitter unit adapted to attach the transmitter unit to the dashboard of a boat.

8. The apparatus of claim 1, further comprising a security means on the transmitter unit and receiver unit to secure the transmission of data from the transmitter unit to the receiver unit.

9. The apparatus of claim 1, further comprising an attachable sensor means for detecting a water depth and a depth transmitter, wherein when the sensor means detects that it is submerged in water a signal is transmitted to the receiver unit to indicate a water depth of the trailer.

10. An apparatus for providing instructions to an operator of a motor vehicle attached during backing up procedures, said apparatus comprising:
    (a) a transmitter unit for wirelessly transmitting data, wherein the transmitter unit includes a plurality of predefined directives and a plurality of activation means wherein each of the plurality of activation means is capable of transmitting one of the plurality of predefined directives;
    (b) a receiver unit for wirelessly receiving data from the transmitter, wherein the receiver unit includes a plurality of indicator means wherein each of the plurality of indicators means is capable of indicating one of the plurality of predefined directives; and
    (c) a selection means for selecting an operation mode, wherein possible operation modes include a trailer mode and a single vehicle mode;
    wherein the predefined directives include at least a backdown directive, a stop directive, a left directive, a right directive, and a forward directive, and wherein when the trailer mode is selected, the activation means corresponding to the right directive results in the indicator means corresponding to the left directive being activated in the receiver unit and the activation means corresponding to the left directive results in the indicator means corresponding to the right directive being activated in the receiver unit.

11. The apparatus of claim 10, wherein the transmitter unit and the receiver unit each further comprise a microphone and speaker to enable voice communications.

12. The apparatus of claim 10, wherein the plurality of activation means on the transmitter unit comprise a plurality of actuating buttons and the plurality of indicator means on the receiver unit comprise a plurality of indicator lights which emit light upon activation.

13. The apparatus of claim 10, wherein the plurality of indicator means on the receiver unit comprise a plurality of audible messages which are played upon activation.

14. The apparatus of claim 10, further comprising an attachment means on the receiver unit adapted to attach the receiver unit to the dashboard of an automobile.

15. The apparatus of claim 10, further comprising an attachment means on the receiver unit adapted to attach the receiver unit to the steering column of a automobile.

16. The apparatus of claim 10, further comprising an attachment means on the transmitter unit adapted to attach the transmitter unit to the dashboard of a boat.

17. The apparatus of claim 10, further comprising a security means on the transmitter unit and receiver unit to secure the transmission of data from the transmitter unit to the receiver unit.

18. The apparatus of claim 10, further comprising an attachable sensor means for detecting a water depth and a depth transmitter, wherein when the sensor means detects that it is submerged in water a signal is transmitted to the receiver unit to indicate a water depth of the trailer.

\* \* \* \* \*